March 13, 1934. A. B. AGNEW 1,950,375
METHOD OF PRODUCING REFRACTORY BRICK AND KILN THEREFOR
Filed Dec. 4, 1931 6 Sheets-Sheet 1
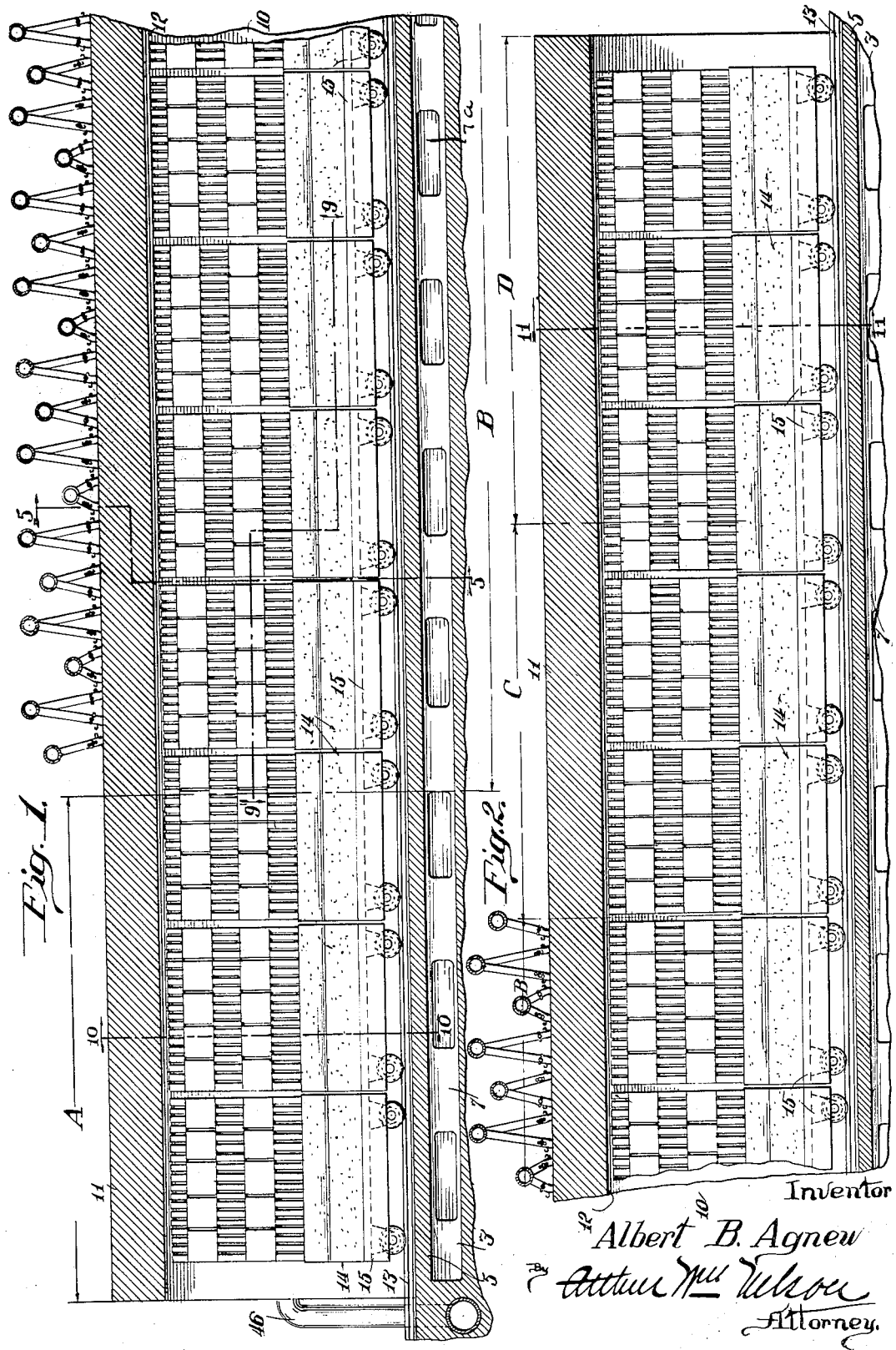

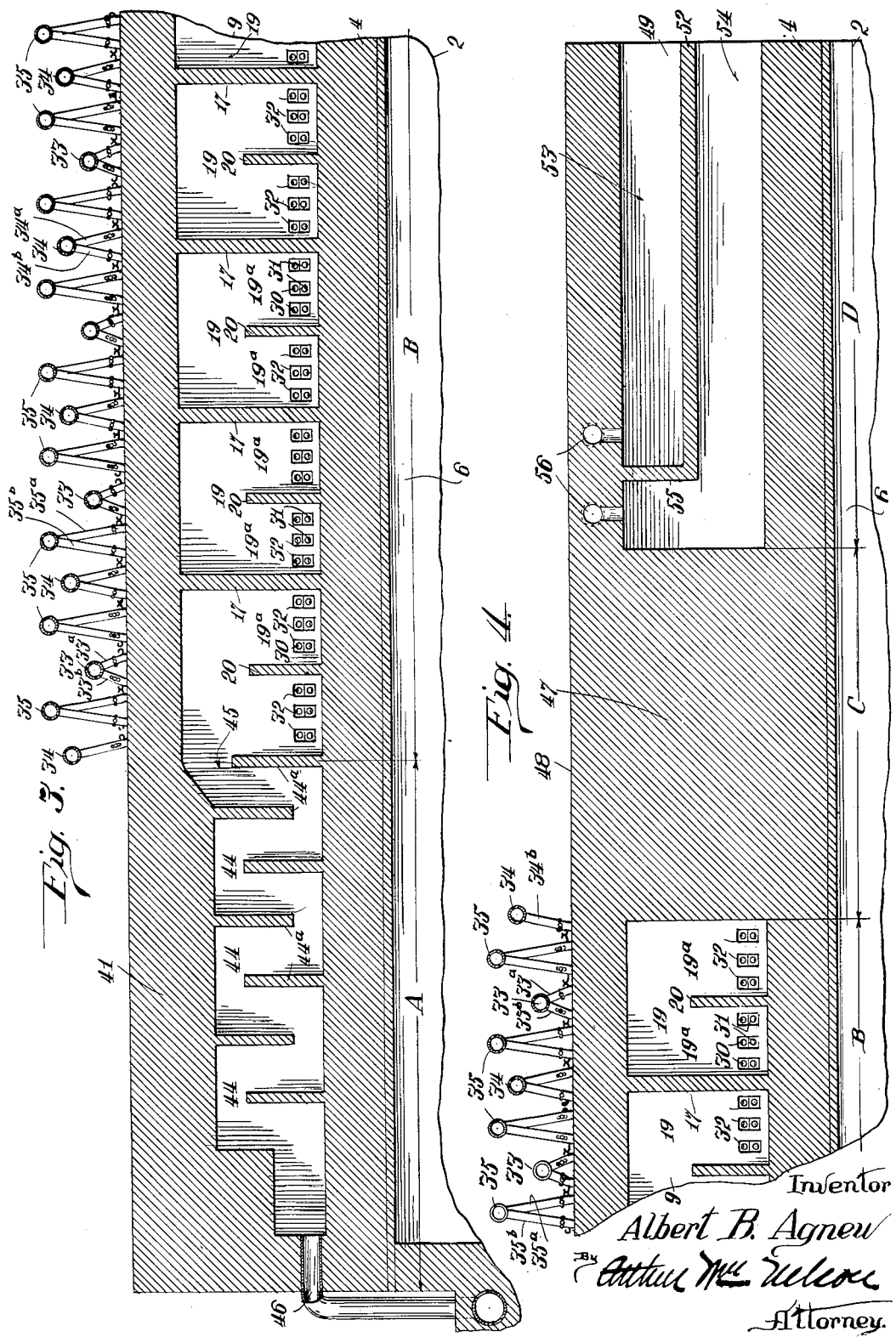

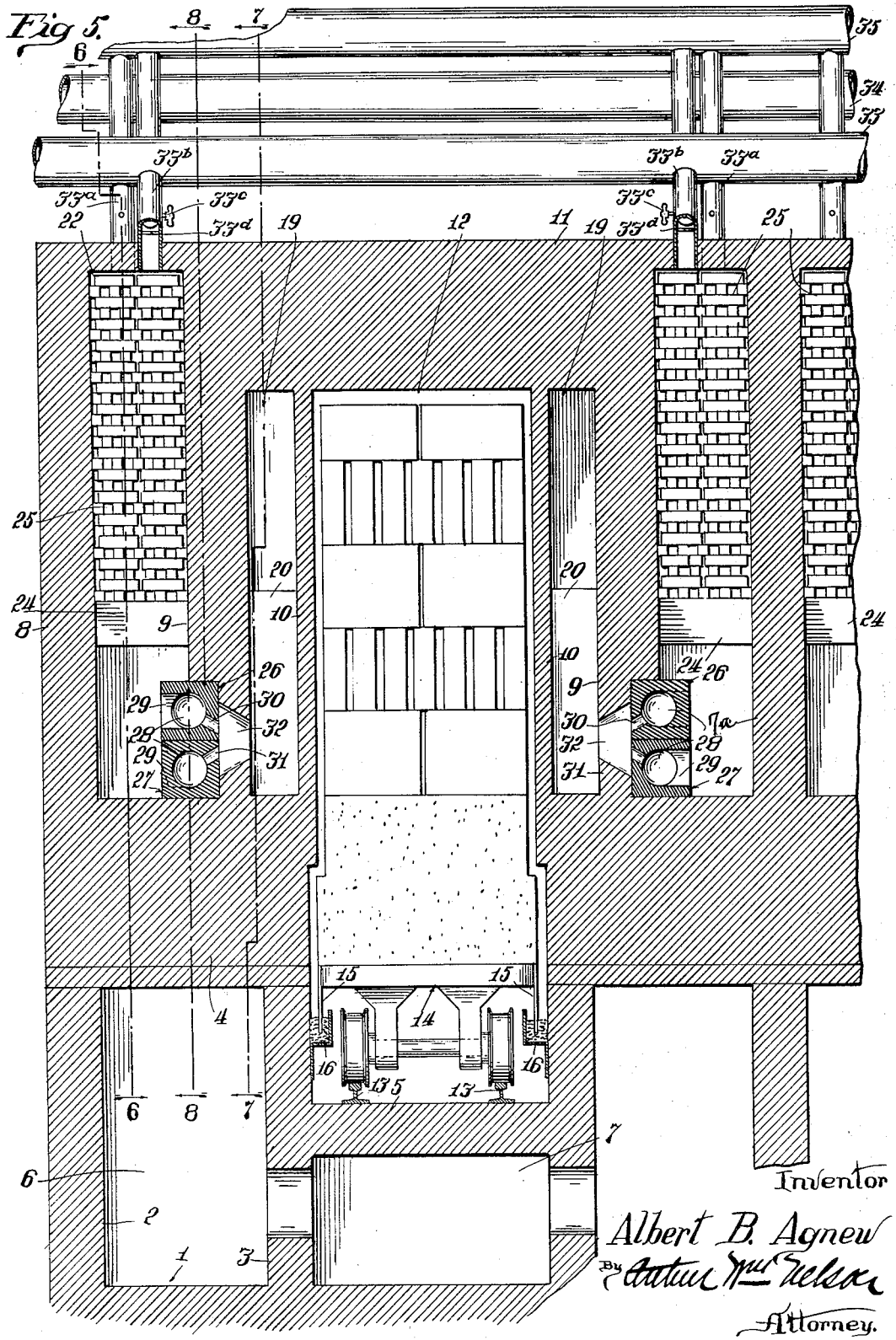

March 13, 1934.   A. B. AGNEW   1,950,375
METHOD OF PRODUCING REFRACTORY BRICK AND KILN THEREFOR
Filed Dec. 4, 1931   6 Sheets-Sheet 4
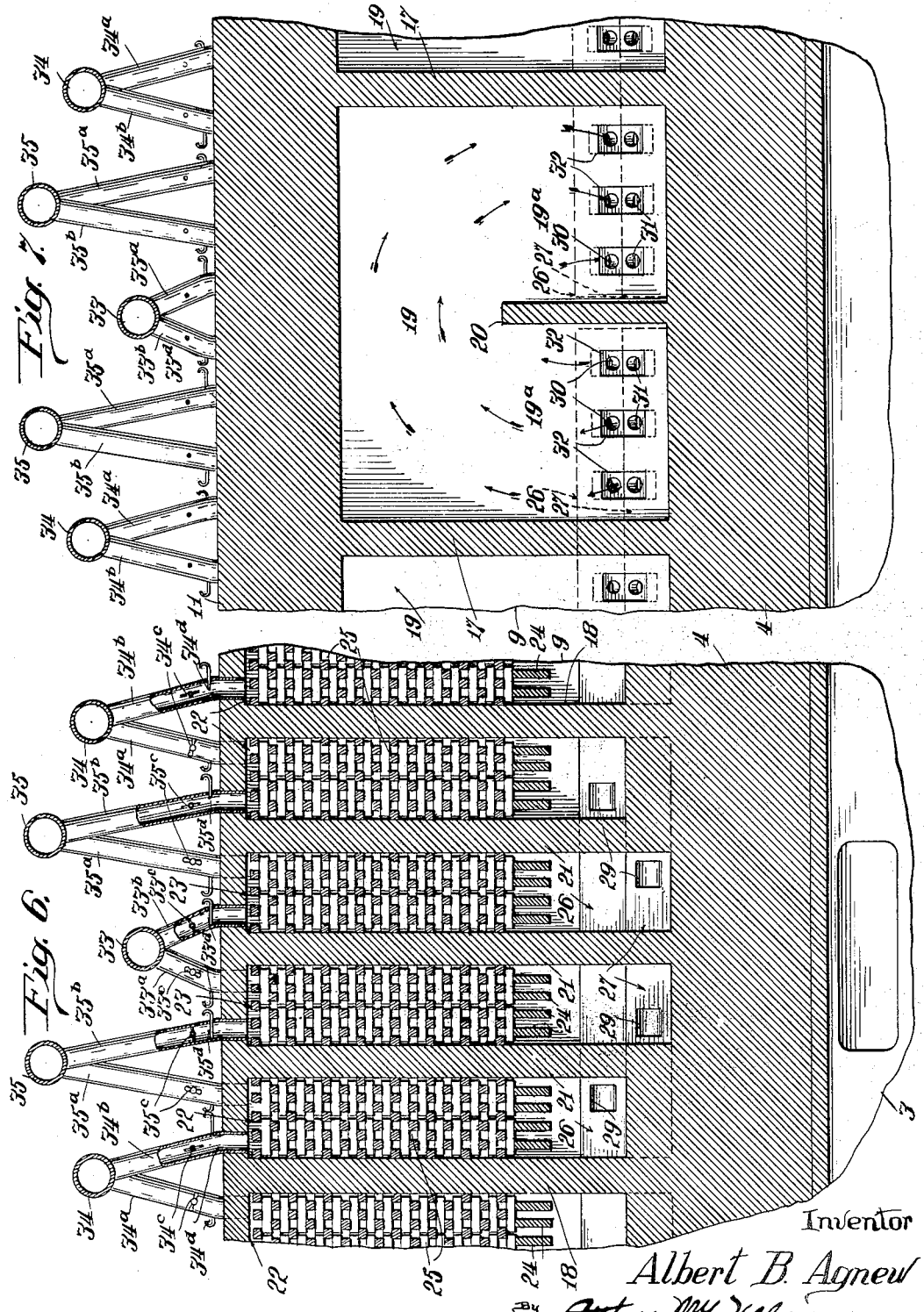
Inventor
Albert B. Agnew
By Arthur M. Nelson
Attorney.

March 13, 1934. A. B. AGNEW 1,950,375
METHOD OF PRODUCING REFRACTORY BRICK AND KILN THEREFOR
Filed Dec. 4, 1931 6 Sheets-Sheet 5
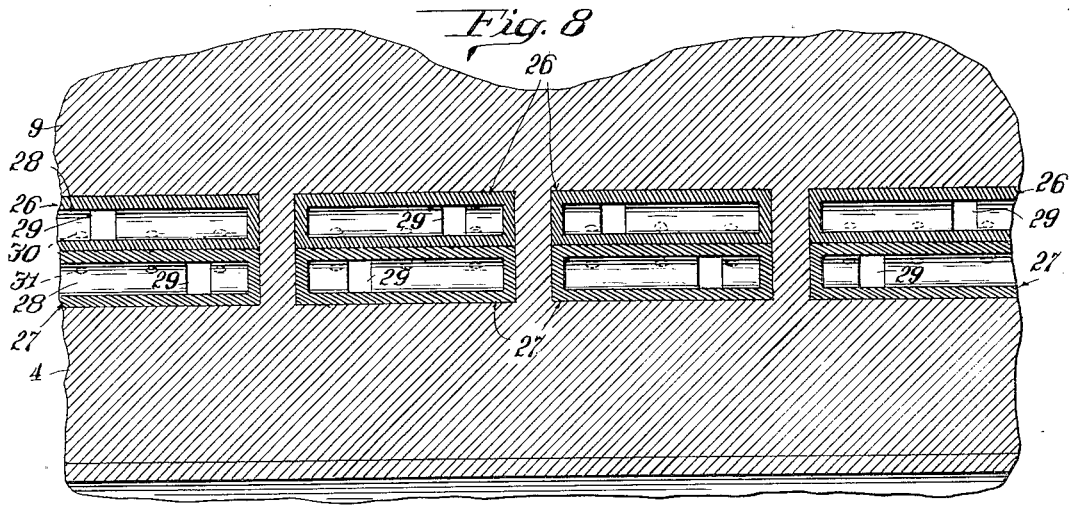
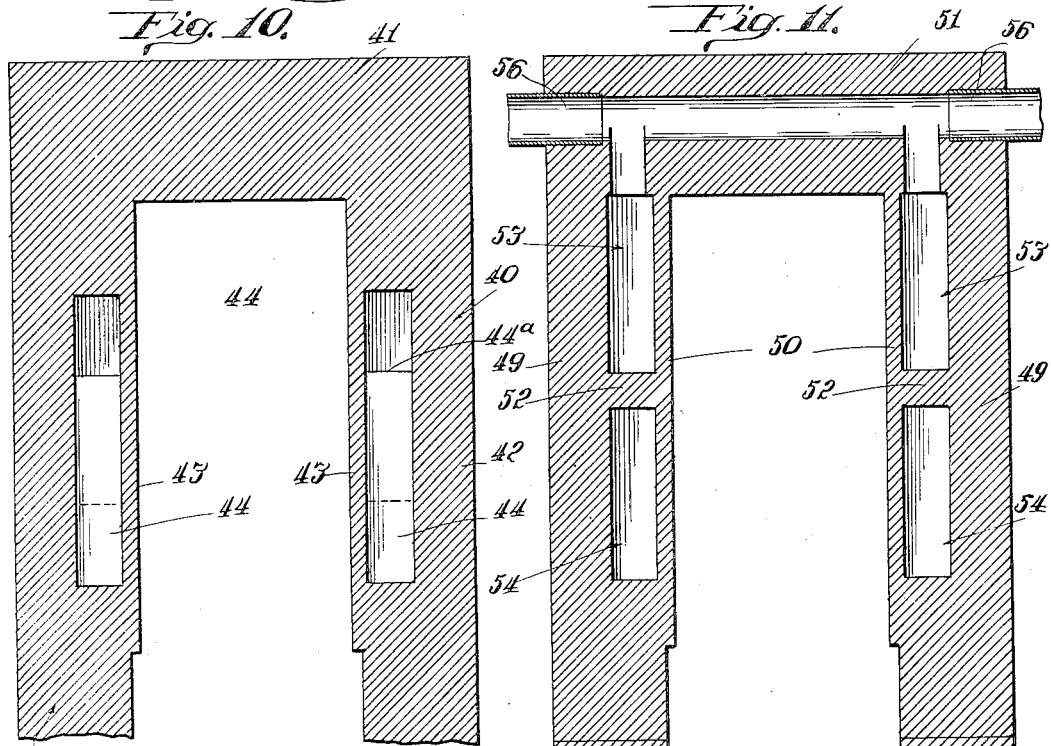
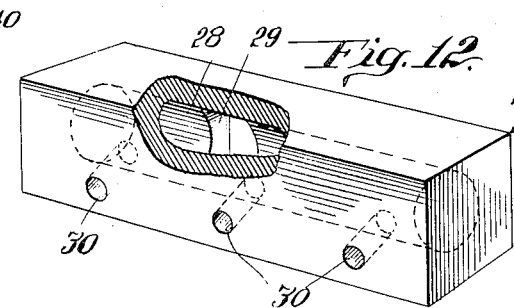
Inventor
Albert B. Agnew
By Arthur W. Tilton
Attorney.

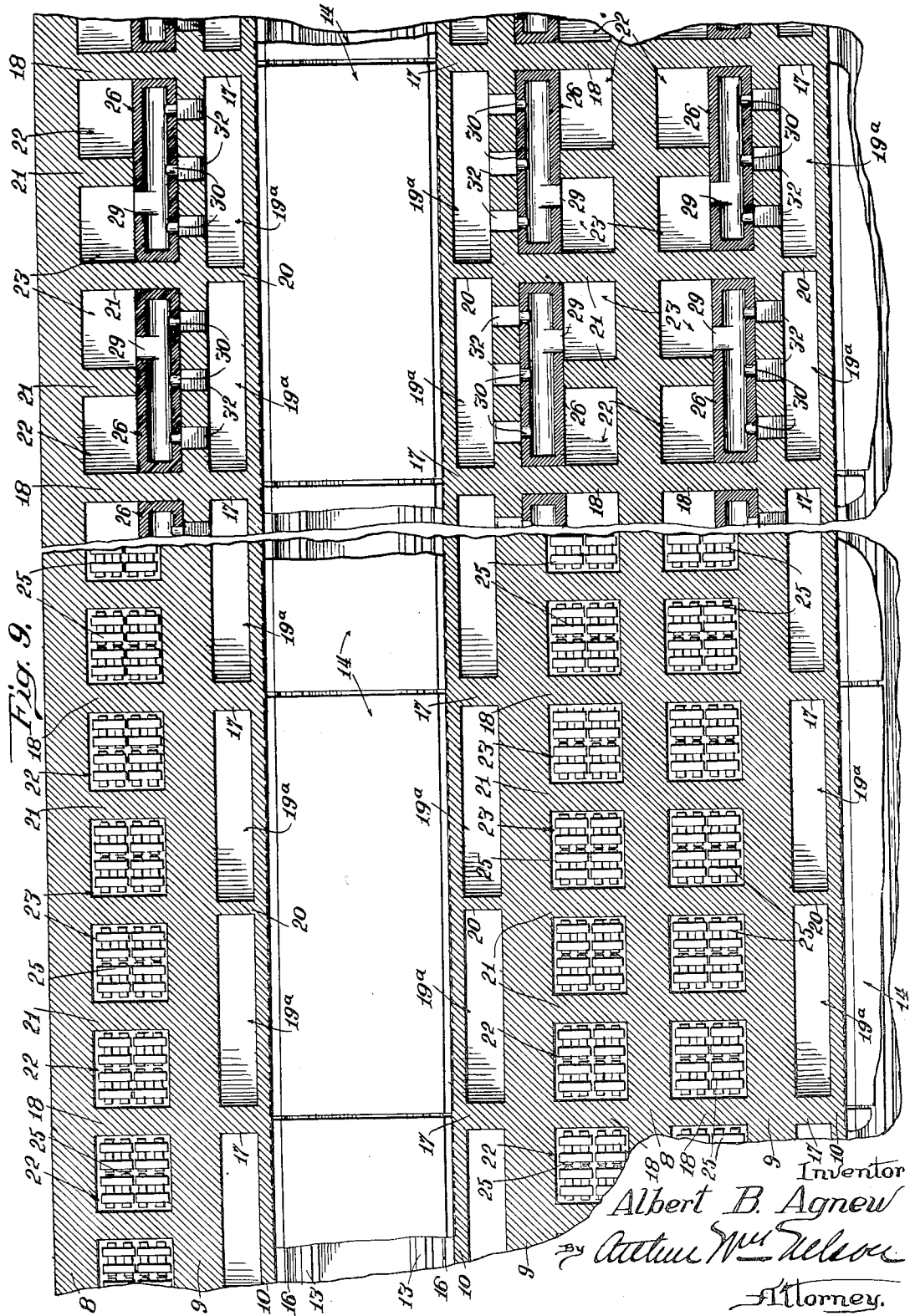

Patented Mar. 13, 1934

1,950,375

UNITED STATES PATENT OFFICE 1,950,375

METHOD OF PRODUCING REFRACTORY BRICK AND KILN THEREFOR

Albert B. Agnew, Calumet City, Ill.

Application December 4, 1931, Serial No. 578,975

39 Claims. (Cl. 25—142)

This invention relates to improvements in methods of producing refractory brick and kilns therefor, and it consists of the matters hereinafter described and more particularly pointed out in the appended claims.

It is an object of the invention to provide a method wherewith it shall be possible to produce refractory brick at less cost than is possible with the methods heretofore devised.

Another object of the invention is to provide a method wherewith it shall be possible to produce refractory brick in a shorter period of time and with less fuel than is required for methods heretofore available, as well as to provide a method wherewith it is possible to produce better brick.

A further object of the invention is to provide a tunnel kiln of novel construction wherewith the above methods may be advantageously practiced.

Again it is an object of the invention to provide an improved kiln for burning fire brick (especially silica brick) characterized by a battery arrangement, wherein the desired number of sections each including a narrow tunnel, are disposed in side by side relation.

Another object of the invention is to provide a kiln having a relatively narrow tunnel including a burning zone having a plurality of combustion chambers arranged upon opposite sides thereof, each being independently controllable whereby the desired temperature may be maintained in the associated part of the burning zone, without unduly changing the temperature in other parts of the kiln.

A further object of the invention is to provide a kiln wherewith it shall be practicable to operate simultaneously upon a number of relatively small masses of brick, instead of operating upon a large mass of the same aggregate volume as the combined volume of the smaller masses whereby a more uniform heat distribution is obtained with a corresponding saving in fuel and time as compared with wide tunnel kilns now in use and in which there is generally a lag of from 30 to 36 hours in certain parts of the mass reaching the temperature obtaining in other parts of the mass.

Still another object of the invention is to provide a tunnel kiln which shall be operable without the admission of air to the tunnel proper for combustion purposes.

Again it is an object of the invention to provide a kiln wherein it shall be practicable to burn even a small amount of brick without the necessity of enclosing the same in casing brick and thereby effect a considerable saving in time, material, labor, storage and similar items.

The above mentioned objects of the invention, as well as others, together with the many advantages thereof, will more fully appear as I proceed with my specification.

In the drawings:

Fig. 1 is a longitudinal vertical sectional view through the preheat end or zone and a part of the burning zone of one of the battery sections of the kiln in the plane of the tunnel thereof.

Fig. 2 is a longitudinal vertical section through the other part of the burning zone together with the soaking and cooling zone of the kiln in the plane of the tunnel shown in Fig. 1 and which forms a continuation of the right hand end of Fig. 1.

Fig. 3 is a longitudinal vertical sectional view through the preheat end or zone and a part of the burning zone of the kiln section shown in Figs. 1 and 2 in the plane of the combustion chambers thereof.

Fig. 4 is a longitudinal vertical sectional view through the other part of said burning zone together with the soaking and cooling end or zone of the kiln in the plane of the chambers shown in Fig. 3 and which forms a continuation of the right hand end of said Fig. 3.

Fig. 5 is a transverse vertical sectional view on an enlarged scale, through a battery kiln embodying my invention, and capable of carrying out my improved method, the plane of the section being taken on the line 5—5 of Fig. 1.

Fig. 6 is a longitudinal vertical sectional view through a part of the firing zone of one section of the kiln, in the plane of the regenerating chambers thereof and which is indicated by the line 6—6 of Fig. 5.

Fig. 7 is another longitudinal vertical sectional view through a part of the firing zone of said section of the kiln shown in Fig. 5, in the plane of the combustion chambers thereof and which plane is indicated by the line 7—7 of Fig. 5.

Fig. 8 is a detail longitudinal vertical detail sectional view through a portion of said burning zone as taken in the plane of the fuel feeding nozzle blocks as indicated by the line 8—8 of Fig. 5.

Fig. 9 is a longitudinal horizontal sectional view through burning zone of the kiln and parts of adjacent zones as taken on the line 9—9 of Fig. 1.

Fig. 10 is a transverse vertical sectional view through the preheat end or zone of the kiln as taken on the line 10—10 of Fig. 1.

Fig. 11 is a transverse vertical sectional view through the cooling end or zone of the kiln as taken on the line 11—11 of Fig. 2.

Fig. 12 is a perspective view of one of a number of fuel and air feeding nozzle blocks embodied in my improved kiln.

The improved kiln embodying my invention is especially adapted for use in burning or firing silica brick in accordance with the improved method but this is to be considered merely as illustrative of one use for such a kiln, because as will be apparent, it may also be used in burning or firing other brick for refractory purposes when the peculiar characteristics of the invention make it of advantage to do so.

Silica brick expand upon being heated and attain three fourths of their expansion of about ⅜ inch per foot upon being heated to 1250° F. and are almost constant in volume above that point. If expansion takes place too rapidly, stresses are set up in the brick which may either cause visible spalling or produce internal cracks which weaken the structure and shortens their life. Therefore, silica brick should always be heated or cooled slowly between atmospheric temperature and a dull red heat. Within this temperature range, they are sensitive to rapid temperature changes and if heated or cooled too rapidly, will crack or spall.

Heretofore such brick have been burned in periodic kilns or in a continuous kiln of the tunnel type, embodying a single, relatively wide tunnel. Both of such kilns are low in acceptable brick output and both therefore, are expensive to operate as well as requiring a long period of time for the burning operation.

In the periodic kiln, which are usually of the down-draft circular type, the "green" but dried brick are set in the spaced relation permitting circulation therethrough. In the case of firing special shapes and sizes larger than the standard 9″ silica brick, which weighs about six pounds, it is the practice to enclose them in smaller brick termed "casing" brick. After the brick have been set, they are fired for the requisite length of time and are then cooled ready for storage or shipment as the case may be. Hence, in such a kiln the entire mass, kiln included, must be raised to high temperature and then permitted to cool.

In the tunnel type of kiln, as heretofore designed and now used, the tunnel is usually from 350 to 500 feet in length and ranges from 6 to 8 feet in height and approximately the same dimensions in width. In burning brick in such a tunnel, the "green" brick are loaded upon cars and are set in spaced relation to permit of a circulation therethrough and so as to leave only a small space between the sides and top of the tunnel and the sides and top of the brick on the cars. The loaded cars are then pushed into the tunnel at one end and are slowly moved through the tunnel in a continuous procession or train until they emerge at the other end in the burned or completed condition. In setting the "green" brick on the car, they are disposed with the larger and more intricate shapes on the central portion of the car and which are enclosed in casing brick as no other manner is known of gradually and uniformly raising the temperatures of the larger brick, to the desired firing heat and of cooling them in a manner to produce commercially salable brick. Both of these kilns, and the methods carried out thereby, require the making of so many more of the small so-called casing brick than can be absorbed by the market that a tremendous surplus of such casing brick accumulates for which there is no available market. The cost of making such "casing" bricks must be included as an item in the cost of the larger bricks and shapes and as the percentage of salable large bricks and shapes made in such kilns is relatively small, due to spalling and cracking, etc., it is apparent that the cost thereof becomes relatively high.

In general, the preferred form of kiln embodying the improved construction, and which is capable of carrying out the improved method, is what may be aptly termed a "battery" type continuous tunnel kiln. Instead of one main tunnel of a comparatively great width and height, as heretofore used, a plurality of narrower tunnels is employed, each with its own preheat end or zone, firing zone, soaking zone and cooling end or zone arranged in the order named. Each tunnel is of such limited width that the brick placed on the associated cars adapted to be moved through the tunnel, is so proportioned relative to the heat conductive character thereof, that they will gradually and uniformly absorb the necessary heat in much less time and in such manner that the use of the casing or protective brick is unnecessary. As the comparatively narrow loaded cars are progressed slowly through a comparatively narrow tunnel, which is preferably but 24 to 30 inches in width, they are first gradually heated by waste products of combustion, to the temperature at which their major expansion takes place and thereafter they enter the firing zone wherein the temperature is increased to that required for proper burning.

The firing zone in each section of the "battery" type of kiln is composed of a plurality of combustion units arranged upon opposite sides of the associated tunnels. These units are independently controllable so that the temperature produced in the corresponding portions of the associated tunnel may be varied as desired. The temperature is relatively low at the preheat end and increases until the highest temperature is reached at substantially the middle of the firing zone. The firing zone temperature diminishes toward the soaking zone of the tunnel. The fired brick give up their high temperature in the soaking zone and then progress toward and through the cooling end or zone, thus gradually giving up their remaining heat until they leave the tunnel as a finished burned or fired brick, cooled to the extent necessary to prevent spalling in the presence of atmospheric temperatures.

The various units of the combustion chambers are reversible and regenerative in character so that after a burning period, the operations of the associated regenerator chambers are reversed. Each unit is independently controllable. As no extraneous means are employed in the tunnel to create a draft lengthwise of the tunnel, the temperature conditions at different points are not disturbed by such a draft and therefore remain constant until changed by manipulation of the valves by which the fuel and air are controlled.

It will be understood of course, that the kiln is made of masonry suitable for the intended purpose and stayed and braced in accordance with standard practices in kiln and furnace constructions. As such stays and braces form no particular part of the present invention, they have not been specifically shown or described.

Referring now in detail to that embodiment of the invention, illustrated in the accompanying drawings:—1 indicates as a whole the foundation of the kiln upon which is suitably supported the various upright walls of the kiln, providing a battery of longitudinally extended relatively narrow kiln sections, arranged side by side. Any desired number of such side by side sections may be employed, according to the desired capacity of the kiln as a whole. As shown herein, there are three of such sections in the battery when the same is considered transversely but this number may be increased should the occasion for the same so arise, merely by adding another section alongside of those already in place. As all sections of the kiln are alike, a description of one will suffice for all.

Each section of the kiln when considered longitudinally, includes a preheating zone at that end into which the loaded cars are placed; a burning or firing zone; a soaking zone; and a cooling end from which the loaded cars are discharged with the finished products thereon. For convenience in future reference, the extent of such zones and ends are best shown in Figs. 1 and 2 and are indicated by the reference letters A, B, C and D respectively.

In the firing zone, and rising from the foundation, are laterally spaced upright side and intermediate walls 2 and 3 respectively. Supported upon said walls are laterally spaced side floors 4—4 and an intermediate rail supporting floor 5 disposed in a plane below that of the side floors 4—4. The arrangement described provides side and intermediate air ducts 6 and 7 beneath the various floors, which communicate with each other by means of openings 7a in the walls 3 below the rail supporting floor 5. These ducts which extend from end to end of their respective kiln sections have atmospheric air circulating therethrough to cool said floors and adjacent parts to prevent their burning out.

Rising from the side floors of the sections are upright side walls 8—8 and spaced inwardly therefrom are pairs of spaced inner and outer upright walls 9 and 10 respectively. Supported upon the side walls is the top wall or roof 11 for the kiln.

In the burning or firing zone, the walls 10—10, roof 11 and floor 5 define a part of the tunnel 12 which extends from end to end of the kiln and which is indeed narrow, say from 24 to 30 inches in width, when compared with the tunnel heretofore used and which approximates from 6 to 8 feet in width. On the floor 5, of each kiln section, are rails 13 upon which travel kiln cars 14. Each car is provided with side plates 15 which depend into sand filled channels 16 supported upon the walls 3—3 to provide a running seal.

The means for heating the firing or burning zone is made in units, with a plurality of units arranged along each side of the tunnel and each unit comprises combustion chambers and two pairs of regenerator chambers. The chambers of the units on one side of the tunnel in this zone, are directly opposite like chambers of the units on the other side of the tunnel.

As best shown in Figs. 3—4, there are six units on each side of the tunnel although this number may be changed if so desired, so that the showing of such a number of units in this instance is to be taken merely as by way of illustration and not by way of limitation.

In the firing zone of the kiln, between the walls 9 and 10 are provided upright, transverse walls 17—17 and in line with said upright transverse walls between the walls 8 and 9 are upright transverse walls 18—18. The walls 17—17 define in the space between the walls 9 and 10, combustion chambers 19 and in each combustion chamber midway between the 17—17 are transverse baffle walls 20. These walls which rise from the floor 4, forming the bottom of said chambers at this point, are about only half the height of the walls 17, so that each combustion chamber may be said to include two compartments 19a—19a connected together at the top.

In the space between the walls 8 and 9 and spaced at equal longitudinal distances between the transverse walls 18 in said space are other upright transverse walls 21—21 defining two pairs of air and gas regenerating chambers 22—23, 22—23 respectively, as best shown in Fig. 6, and which chambers extend from the floor 4 into an elevation above that of the top of the combustion chambers which in turn terminate in the plane of the top of the tunnel.

In each pair of gas and air regenerator chambers, a suitable distance above the floor 4 which forms the bottom therefor, are transversely extending, longitudinally spaced supporting brick 24 for checker brick 25 which extends to substantially the top of the respective chamber.

At the bottom of the regenerator chambers 22—23 and partially set into the face of the associated wall 9 are longitudinaly extending, top and bottom nozzle brick or blocks 26—27, each of a length approximating the length of a pair of associated air and gas regenerator chambers. Each nozzle block has a longitudinal passage 28 therethrough, closed at the ends. Each nozzle block has a rectangular opening 29 in that side facing the respective regenerator chambers 22—23 and which openings are so formed as to be disposed near one of the associated intermediate transverse walls or partitions 21—21 as best shown in Fig. 8. Each nozzle block is provided in its opposite side with longitudinally spaced nozzle openings 30 and 31 respectively, providing pairs of such openings disposed in line with ports 32 provided in the walls 9 and which open into associated combustion chambers as best shown in Fig. 5.

Extending transversely of the kiln, above and in the plane of each middle intermediate transverse wall or partition 21 is a pipe or duct 33 for supplying gas as a fuel to the gas chambers 23—23 and above the kiln in the plane of the walls 17 and 18 are pipes or ducts 34 for supplying that air to the air chambers 22—22 necessary to provide efficient combustion for the gas. Above each other wall 21—21 of the kiln is a pipe 35 leading to a suitable suction device (not shown) such as for instance to the inlet side of a suitable blower, which blows into a stack for disposal. The pipes 33—34 are parallel with the suction pipes and all of these gas pipes lead from a common main while all of the air pipes are connected to a blower which is open to atmosphere.

Each gas supply pipe has downwardly extending branches 33a—33b that open into the top end of adjacent gas regenerator chambers. In each branch are damper-like reversing valves 33c and adjusting valves 33d. By means of the reversing valves, one branch may be opened and the other may be closed and vice versa and by means of the adjusting valves, the volume of gas passing into the respective chamber may be accurately controlled.

Each air supply pipe 34 has downwardly extending branches 34a—34b that open into the top end of adjacent air regenerator chambers 22—22 and in said branches are damper-like reversing valves 34c and adjusting valves 34d. By means of the reversing valves one branch may be opened and the other may be closed and vice versa and by means of said adjusting valves the volume of air passing into the respective chambers may be accurately controlled. Each suction pipe 35 has connected thereto downwardly extending branches 35a—35b one of which opens into an adjacent air regenerator chamber and the other of which opens into an adjacent gas regenerator chamber. In said branches are damper-like reversing valves 35c and adjusting valve 35d. By means of these valves the branches may be opened and closed and otherwise controlled as to outlet volume as is apparent. The various reversing valves are all connected up with suitable mechanisms for operating them in proper timed relation but as such mechanism forms no part of the present invention, said mechanism is not herein illustrated nor described. It is apparent, however, that with the arrangement described, one air pipe 34 serves two adjacent air regenerating chambers 22, one gas pipe 33 serves two adjacent gas regenerating chambers 23 and one suction pipe serves adjacent air and gas regenerator chambers.

For purpose of simplicity and illustration in describing the operation of the various chambers in the firing zone, only the operation of one unit thereof will be described, the operations of the chambers in the other units being similar. In firing one unit, which comprises one combustion chamber and two air and two gas regenerator chambers, the valve 34c in the branch 34a of one adjacent air pipe are opened and the valves 34c in the branch 34b of said air pipes are closed. The valves 33c in one branch 33a of the gas pipe is opened and the valve 33c in the other branch 33b is closed. The valves 35c in the branches 35a—35b of one suction pipe are closed and the like valves in said branches of the other suction pipe are both open.

Assume that the air and gas regenerator chambers shown in at the left hand side of Fig. 7 were previously "on" so that the checker brick in said chambers have been heated to a high temperature by the products of combustion that passed through said chambers to the associated suction pipe 35. Thus gas enters the top of one gas regenerator chamber 23 from the now open branch 33a of the gas pipe and passes down through the heated checker brick therein to absorb heat therefrom and air enters the top of the associated chamber 22 from the now open branch 34b of the air pipe 34 and passes down through the checker brick in said chamber. This heated air then enters the passage 28 in top nozzle block 26 (through the opening 29) and the heated gas enters the passage 28 of the bottom nozzle block through the opening 29 thereof. Air and gas leave their respective nozzle blocks 26—27 through the nozzle openings 30—31 to intermix in an associated combustion chamber. In this respect, it is pointed out that the nozzle openings 30 and 31 converge toward each other so that the air and gas mix at the mouth of the port 32. The products of combustion then enter the bottom of one compartment 19a of the combustion chamber and are directed toward the top of said combustion chamber by the baffle 20 and then pass toward the other end of said chamber and then down toward the bottom of the other compartment 19a thereof. From said last mentioned compartment of said chamber, the products of combustion enter the ports 32 and pass through the nozzle orifices of both nozzle bricks into the passage 28 therein and out through the openings 29 of said nozzle blocks into the other air and gas generator chambers 22—23. In this passage of said products of combustion into the said other gas and air regenerator, under the action of the suction pipe 35 associated therewith and the branches of which are open, said products are evenly divided and pass up through the checker brick therein, to said suction pipes which deliver the spent products to a suitable place of disposal such as a stack. In this upward passage of said products of combustion through said chambers the checker brick absorb a high degree of heat so that upon reversal, the air and gas passing downwardly therethrough becomes preheated, ready for mixing at the nozzle openings for burning. Upon such reversal the various valves in the branch pipes are reversed in position so that the passage is in the other direction.

It is of course apparent, that the direction of said products is always toward that suction pipe in the "on" position and this reversal is made at intervals in accordance with the cooling effect the incoming air and gas has upon the checker brick in the regenerator chambers 22—23. With such an arrangement, the high temperature of the products of combustion in the combustion chambers passes by conduction through the tunnel side walls 10—10 which are relatively thin and then radiate therefrom into the tunnel to heat the interior of the same. It is to be understood that the units on both sides of the tunnel are operated in unison so that the heating of the tunnel transversely from top to bottom is substantially uniform throughout. Thus with a number of such units arranged longitudinally along each side of the tunnel and with each unit being controllable as to temperature, it is apparent that said units may be so operated as to gradually increase and then decrease the temperature in said zone from end to end so that the temperature necessary to burn or fire the brick may be regulated to a nicety.

Forwardly of the burning zone for each kiln section of the battery is the preheating end which includes laterally spaced duplex side walls 40—40 and a roof 41, the inlet for said preheating end being provided with any approved type of door mechanism not shown which may be opened and closed to permit the entrance of the cars 14 loaded with set "green" but dry brick.

Each duplex side wall includes laterally spaced side wall parts 42—43 defining between them a space or chamber 44 closed at the top and bottom. The rear end of each chamber communicates with the endmost combustion chamber by a passage 45 leading off from the top of said chamber while the front end of said space or duct is closed. In each space 44 are longitudinally spaced baffles 44a, alternate ones of which terminate short of the bottom of said space and the intermediate ones of which terminate short of the top of said space. The other end of this space or chamber has connected thereto one end of a pipe 46 leading to a suitable suction source and which may or may not be the suction to which the pipes 35 before mentioned are connected.

Thus under the influence of the suction existing in said pipes 46, a part of the products of combustion of the endmost combustion chambers with which said spaces 44 communicate is bled from said chambers and is drawn through said space or chamber to heat the wall parts 42 and which form continuations of the tunnel wall 10—10. It is apparent that the baffles 44a cause said products of combustion bled from the aforementioned combustion chambers to follow a tortuous or up and down zigzag path. Thus while the temperature of said wall parts become lowered toward the inlet end of the preheating zone, said temperature remains substantially uniform from top to bottom of said space at different points along said preheating zone part of the tunnel.

To the rear of the firing zone is located the soaking zone before mentioned. Said zone is defined by relatively heavy or thick solid upright wall parts 47 of a thickness approximating the combined thickness of the walls 8, 9 and 10 of the burning zone and their associated combustion and regenerating chambers and a top wall part 48 forming a continuation of the top wall part of the firing or burning zone, the inner faces of said side wall parts 47 defining the associated part of the tunnel.

To the rear of said soaking zone, is the cooling zone before mentioned and which is constituted by pairs of laterally spaced inner and outer upright wall parts 49 and 50 and a top wall or roof 51. The said upright wall parts of the cooling end or zone define a space between them in each of which is provided a longitudinally extending, horizontally disposed, partition 52 providing top and bottom ducts 53 and 54 respectively. Both ducts open at the rear extremities to atmosphere. An upright transverse partition 55 serves to separate said ducts at their front end and open into transverse flues 56 in the roof or top wall of the cooling end of the kiln section. These flues can be trunk flues common to all ducts 53—54 of the various kiln sections and may lead to a suitable suction device to create a forced draft from the rear to the front end of said ducts. Thus these ducts act to carry off heat from the wall parts forming the cooling end or zone of the tunnel and said cooling end or zone thus gradually diminishes in temperature toward its rear or discharge end. The end of the tunnel associated with said cooling zone of course, is normally closed by any approved type of door, not shown.

The tunnels provided in the various sections are each of substantial length and coolest at its rear end and the temperature increases from said end toward the middle of the burning zone and then cools down toward its preheat end or zone but not to such a low temperature as exists at said rear end.

In the manufacture of silica fire brick, the raw material is first moulded to desired shape and size and the brick in this condition are loaded upon trays and placed upon trucks which are entered into a drying oven. This drying oven can be conveniently heated to the desired temperature by waste heat from the battery of kilns mentioned and preferably by the air in turn heated by its passage through the ducts 53 and 54 in the upright walls of the cooling end of said tunnel sections.

After the brick have been dried to that extent to permit handling, they are set or stacked upon the decks of the cars 14 in a manner which will substantially fill a part of a tunnel but will leave a clearance between the brick and the tunnel side walls and roof.

Such a loaded car is then moved into a tunnel at the preheating end, after opening the door, and is then engaged with the car previously moved into the tunnel so that the entire train of loaded cars therein, is moved a car length when another loaded car is placed in the tunnel. The load of brick set or placed upon such a car is very narrow as compared with a load of brick operating in a single type tunnel kiln of the kind heretofore devised, and now in use.

After a loaded car has been placed in the preheat end of a tunnel, the said door at said end of the tunnel is closed. Thus each car load of brick to be burned is indeed slowly heated in this end of the tunnel as it moves toward the firing or burning zone until the brick have reached the critical temperature at which spalling and cracking would occur if they were too quickly subjected to high temperatures. With the various parts arranged as before described, this so-called critical temperature prevails at the end of the preheating zone and at the beginning of the firing zone. In the front end of the firing zone, the temperature of the brick rises and is increased toward the middle of the firing zone and is then decreased toward its other end as it approaches the soaking zone. This difference in temperature lengthwise of the firing zone is controlled by the fuel and air valves and although different temperatures may prevail along different points of this zone, said temperature is substantially the same at the top of each point along said zone, as it is at the bottom.

As the train of loaded cars are thus passed through the tunnel, they are successively subjected to the various temperatures and absorb the heat required to change their properties and to provide the finished burned or fired brick. After the cars pass through the firing zone and reach the soaking zone, they "soak" in their own heat and gradually give up the same so that they cool to a temperature below the critical one at which spalling and checking would occur. After leaving the soaking zone the loaded cars pass into the hotter end of the cooling zone and then move toward the cooler end, so that when they reach the coolest end of the cooling zone they are at such temperature as will permit them to be exposed to normal atmospheric temperature without damage.

Thus with the improved battery type of kiln, it is possible to advance a plurality of smaller masses of brick through the narrower tunnels and produce a greater quantity of fire brick per unit of time than is possible with the method heretofore employed wherein a plurality of large masses is advanced through a large tunnel kiln. Thus it is possible to produce the desired quantity of brick in less time, with less fuel, and at less expense. The quality of the brick is also improved.

The reason for the above is apparent, because when the smaller and narrower masses or loads of brick are thus burned, the interior of the mass is not so remote or so far removed from the exterior of the mass as to make heat conductivity difficult. In other words, the brick on the longitudinal median line of a narrow load or mass of brick, can be more quickly brought up to the necessary high temperature and then reduced, than it is possible in a much wider mass. This is apparent because in tunnel practice as heretofore carried out, the load or mass of brick is from six to eight feet wide. Thus to transmit heat to the brick at the middle of the mass or load, this must all be done from the outermost brick inward toward the middle, and to conduct a burning heat through such a mass, the outermost brick must be subjected to a temperature far beyond that required to properly burn them. To protect such brick against such extreme temperature, the outermost ones were enclosed in smaller brick, termed "casing" brick, which further aggravated the condition under which it was attempted to operate. This again resulted in the production of the smaller brick in amounts far beyond the market demand therefor, with the result that larger surpluses of such smaller brick accumulated and had to be stored and for which no appreciable market exists. It is apparent that many obstacles arose in operating upon a large mass of brick in a single tunnel and one of the more serious ones is the lack of control of temperature from top to bottom of the tunnel along different points in its firing zone. Certain of the bricks received their heat too quickly and others received their's too slowly, with the result that the salable bricks produced were far outnumbered by the unsalable ones. As it requires as much labor material and fuel costs to operate upon the unsalable ones, as upon the salable ones, the reason for the cost of such brick made in the manner above mentioned, may be readily appreciated.

By operating upon a plurality of trains of cars with narrower loads thereon in narrower tunnels arranged in battery form, many advantages are attained. The battery type of kiln is flexible in its structure, in that to increase its total output, it is only necessary to add a new tunnel section when the demand is materially greater than such output. In this respect, it is also necessary to add to the piping described. In a battery type of kiln, when occasion demands, one or more sections may be shut down and kept at only that temperature known as "starting" temperature, ready for the resuming of actual firing operation as occasion demands.

In the operation of the single tunnel type of kiln, attempts to modify, change or control the temperature in some particular section or zone thereof, such as that of the burning or firing zone, are not at all satisfactory or practical. When changing the temperature of said zone, the temperature throughout not only the length of the tunnel automatically changed therewith, but the temperature varied from top to bottom along different points in the tunnel. Thus when it was found necessary or advisable to raise the temperature at the firing zone, the temperature in other points in the kiln, raised in accordance therewith, and this resulted in a considerable waste of fuel. The reason for this condition in a kiln of this type, is that there is a long flow or movement of the products of combustion throughout the length of the kiln and no provision is available to prevent such a flow or movement, or to confine it to any particular zone.

In a type of kiln embodying my invention, it is possible to control the temperature at any point along the firing zone, by actuating the valves of the branch pipes connected to the various chambers in said zone and as the products of combustion are not discharged into the tunnel but the combustion chambers are isolated therefrom, and are relatively small, it is apparent that the temperatures may be more readily controlled. With a construction and arrangement of this kind, actual tests show that stack temperatures are lower and this indicates a positive saving in fuel consumption.

Again, by the arrangement of the regenerator and combustion chambers described herein, kiln construction is simplified, and heat is evened from top to bottom of the tunnels. This condition is apparent by reasons of the arrangement in the combustion chambers wherein the fuel is introduced at the bottom thereof near one end, and the products of combustion then pass upwardly and longitudinally, and then downwardly and out of the combustion chamber at the bottom thereof from the other end. Thus at different points along the burning zone, the temperature is substantially the same at the bottom of the tunnel as it is at the top.

The improved construction is especially adapted for using gas of low B. t. u. content, such as producer gas as a fuel as such gas may be preheated, before mixing with heated air. If however, a natural gas having a high B. t. u. content is used, such gas need not be preheated, but may be discharged directly into the combustion chamber to mix with the air previously heated in the regenerator chambers. Should oil be used as a fuel, it would be directly introduced into the combustion chamber, because if it were subjected to the high temperatures of the regenerator chambers, it would break down or crack, and this is not desirable.

Again, in a battery kiln of this kind, it is commercially possible and is indeed practical to burn brick of given characteristics and shapes which it is not possible to burn in a single and relatively wide tunnel type of kiln. In a battery type of kiln such as described herein, relatively heavy and massive brick of regular or irregular shapes may be burned in one of the narrow tunnels thereof and in the next or adjacent narrow tunnel, a much lighter and smaller brick may be burned and again fuel is saved, as well as producing a higher percentage of salable brick, because it is not necessary to keep the lighter and smaller brick in the tunnel for that length of time required to properly burn a heavier one.

A single tunnel kiln of the type previously referred to is an extremely expensive structure, but with applicant's novel construction, a battery type of kiln embodying a number of narrower tunnels can be produced at substantially the same if not at a lesser cost and with the gain of the operating advantages above referred to. With a battery type of kiln it is practicable and commercially possible where only a small quantity of brick per day is required, to operate only one or more of the tunnels, whereas in the single tunnel type, radiation heat losses are so high that it is not at all practicable to run the same at such a low capacity.

While in describing my invention, I have referred in detail to the form, arrangement and construction of the various parts thereof, as well as to the sequence of the steps whereby my improved method is readily carried out, the same is to be considered merely as illustrative so that I do not wish to be limited thereto, except as may be specifically set forth in the appended claims.

I claim as my invention:—

1. In a tunnel kiln construction, means providing a tunnel and means providing a preheating zone associated with one end of said tunnel and including chambers, one on each side of said tunnel and independent of each other and means for heating said chambers.

2. In a tunnel kiln construction, means providing a tunnel, a firing zone therefor including a combustion chamber and a preheating zone associated with one end of said tunnel and including a chamber provided with heat bled from the combustion chamber.

3. In a tunnel kiln construction, means providing a tunnel and a preheating zone including independent chambers disposed one upon opposite sides of a part of the tunnel and restricted in size in comparison with the tunnel.

4. In a tunnel kiln construction, means providing a tunnel, a preheating zone associated with one end of the tunnel and including chambers, one on each side of said tunnel and independent of each other, means for heating each chamber from one end thereof and means in each chamber providing baffles providing a tortuous path through said chamber from one end thereof to the other end.

5. In a tunnel kiln construction, means providing a tunnel, a preheating zone associated with one end of the tunnel and including chambers, one on each side of said tunnel and independent of each other means for heating said chambers each from one end thereof and means for inducing a movement of the heating medium from said end of said chamber towards the other end thereof.

6. In a tunnel kiln construction, means providing a tunnel, a firing zone therefor including a plurality of combustion chambers arranged longitudinally of a part of the tunnel and a preheating zone associated with another part of the tunnel and including a chamber provided with heat bled from one of said combustion chambers.

7. In a tunnel kiln construction, means providing a tunnel, a firing zone spaced from one end of the tunnel and including a combustion chamber on opposite sides of the tunnel, a preheating zone at said end of the tunnel and including chambers on opposite sides of said tunnel and each of which chambers is in communication with an adjacent combustion chamber for the bleeding of a part of the products of combustion therein.

8. In a tunnel kiln construction, means providing a tunnel extending from end to end of the kiln and a firing zone of a length less than that of the tunnel and through which a part of the tunnel extends, said firing zone including a combustion chamber one each side of said tunnel and independent of each other, said chamber being isolated from said part of the tunnel and terminating at the top in substantially the plane of the top of the tunnel.

9. In a tunnel kiln construction, means providing a tunnel extending from end to end of the kiln and a firing zone of a length less than that of the tunnel and through which a part of the tunnel extends, the firing zone including combustion chambers arranged with at least one chamber on each side of the tunnel but isolated therefrom.

10. In a tunnel kiln construction, means providing a tunnel extending the length of the kiln and a firing zone for a part of the tunnel including a plurality of independently controllable combustion chambers arranged along at least one side of the tunnel but isolated therefrom and terminating at the top in substantially the plane of the top of the tunnel.

11. In a tunnel kiln construction, means providing a tunnel extending the length of the kiln and a firing zone for a part of the tunnel including a plurality of closely adjacent, longitudinally extending combustion chambers arranged along each side of the tunnel but isolated therefrom and terminating at the top in substantially the plane of the top of said tunnel, the chambers on one side of the tunnel being independent of those on the other side of the tunnel, and means for controlling the operation of said combustion chambers, the one independent of the others.

12. In a tunnel kiln construction, means providing a tunnel extending the length of the kiln and a firing zone for a part of said tunnel including at least one combustion chamber isolated from said tunnel part and regenerating chambers associated with said combustion chamber.

13. In a tunnel kiln construction, means providing a tunnel extending the length of the kiln and a firing zone for a part of said tunnel including a plurality of separate combustion chambers arranged along one side of said tunnel part and isolated therefrom and regenerating chambers associated with each combustion chamber and disposed upon the same side of the tunnel.

14. In a tunnel kiln construction, means providing a tunnel extending the length of the kiln and a firing zone for a part of said tunnel including a plurality of separate combustion chambers arranged longitudinally along each side of the tunnel but isolated therefrom and regenerating chambers associated with the combustion chambers and disposed upon the same side of the tunnel.

15. In a tunnel kiln, a tunnel, a combustion chamber arranged along each side of a part of said tunnel but isolated therefrom and a pair of regenerating chambers associated with each combustion chamber and communicating with the bottom thereof.

16. In a tunnel kiln, a tunnel, a combustion chamber arranged along each side of a part of said tunnel but isolated therefrom, a baffle in said combustion chamber providing compartments communicating with each other at the top of said chamber and a pair of regenerating chambers associated with each combustion chamber and communicating with the bottom of each chamber.

17. In a tunnel kiln, a tunnel, a combustion chamber arranged along each side of a part of said tunnel but isolated therefrom, a baffle in said combustion chamber providing compartments communicating with each other at the top of said chamber and a pair of regenerating chambers associated with each combustion chamber and communicating with the bottom of each chamber, at a plurality of longitudinally spaced points therein.

18. In a tunnel kiln, a tunnel, a plurality of combustion chambers arranged longitudinally along a part of the tunnel and isolated therefrom, a plurality of regenerating chambers associated with each combustion chamber and disposed upon the same side of the tunnel and outwardly from said combustion chambers, said regenerating chambers being so connected to said combustion chambers as to cause a movement of the products of combustion from one end to the other of the associated combustion chamber and from the top to the bottom thereof.

19. In a tunnel kiln, a tunnel a plurality of combustion chambers arranged longitudinally along a part of the tunnel and isolated therefrom, a plurality of regenerating chambers associated with each combustion chamber and disposed upon the same side of the tunnel and outwardly from said combustion chambers, nozzle blocks arranged between each combustion chamber and its associated regenerator chambers and which nozzle blocks communicate on both sides with the bottom part of the respective chambers.

20. In a tunnel kiln, a tunnel, a plurality of combustion chambers arranged longitudinally along a part of the tunnel and isolated therefrom, a plurality of regenerating chambers associated with each combustion chamber and disposed upon the same side of the tunnel and outwardly from said combustion chambers, a baffle in each combustion chamber and terminating below the top thereof to provide longitudinally arranged compartments communicating at the top of the combustion chamber, and nozzle blocks disposed between each combustion chamber and its associated regenerating chambers and affording communication therebetween only at the bottom of said chambers.

21. In a tunnel kiln, a tunnel, a combustion chamber on one side of the tunnel and isolated therefrom, a pair of regenerating chambers associated with said combustion chambers, a nozzle block construction arranged between the bottom ends of said chambers and having openings in one side communicating with the respective regenerating chambers and having pairs of openings in its other side that communicate with said combustion chambers, said nozzle blocks having longitudinal passages therein communicating with said openings.

22. In a tunnel kiln, a tunnel, a combustion chamber on one side of the tunnel and isolated therefrom, a pair of regenerating chambers associated with said combustion chambers, a nozzle block construction arranged between the bottom ends of said chambers and having openings in one side communicating with the respective regenerating chambers and having pairs of openings in its other side, that converge toward each other to communicate with said combustion chamber.

23. In a tunnel kiln, a substantially narrow tunnel, a plurality of longitudinally arranged, separate and independent combustion chambers along each side of the tunnel and isolated therefrom, two pairs of air and gas regenerator chambers associated with each combustion chamber, means between said combustion chambers and its associated air and gas regenerating chamber providing for the admixture and introduction of the air and gas from a pair of such air and gas regenerating chambers into one part of the combustion chamber and for the exit of the products of combustion from another part of said combustion chamber, through the other pair of said air and gas regenerators.

24. In a tunnel kiln, a substantially narrow tunnel, a plurality of longitudinally arranged separate and independent combustion chambers along each side of the tunnel and isolated therefrom, the combustion chambers on one side of the tunnel being disposed opposite those on the other side of said tunnel, two pairs of air and gas regenerator chambers associated with each combustion chamber, means between said combustion chambers and its associated air and gas regenerating chamber providing for the admixture and introduction of the air and gas from a pair of such air and gas regenerating chambers into one part of the combustion chamber and for the exit of the products of combustion from another part of said combustion chamber, through the other of said air and gas regenerators.

25. In a tunnel kiln, a substantially narrow tunnel, a plurality of longitudinally arranged separate and independent combustion chambers along each side of the tunnel and isolated therefrom, two pairs of air and gas regenerator chambers associated with each combustion chamber, with the gas regenerator chambers of each pair disposed side by side and with the air regenerator chambers of each pair arranged along side of an associated gas regenerator chamber, and means between said combustion chambers and its associated pairs of air and gas regenerator chambers for mixing the air and gas from one pair of chambers and introducing it into one end of the combustion chamber and for permitting the exit of the products of combustion from the other end of the combustion chambers into the other of said pairs of air and gas regenerator chambers.

26. In a tunnel kiln construction, means providing a tunnel extending lengthwise of the kiln, means providing a firing zone for a part of said tunnel, means providing a cooling zone for another part of the tunnel spaced longitudinally from the firing zone and a soaking zone for another part of the tunnel arranged between the firing and cooling zones.

27. In a tunnel kiln construction, means providing a tunnel extending lengthwise of the kiln, means providing a preheating zone for one end of the tunnel, means providing a firing zone for an adjacent part of the tunnel, means providing a soaking zone for a part of the tunnel adjacent the firing zone and means providing a cooling zone at the other end of the tunnel, said zones being arranged in the order mentioned.

28. In a tunnel kiln construction, means providing a tunnel extending lengthwise of the kiln, means providing a cooling zone for one end of the tunnel, means providing a firing zone for a part of the tunnel spaced longitudinally from the cooling zone and means on opposite sides of the tunnel between the cooling and firing zones and providing a soaking zone.

29. In a tunnel kiln construction, means providing a tunnel extending lengthwise of the kiln, means providing a cooling zone for a part of the tunnel and including chambers isolated from the tunnel and from each other and means in said chambers dividing the same into horizontally extending, vertically spaced ducts.

30. In a tunnel kiln construction, means providing a tunnel extending lengthwise of the kiln, means providing a cooling zone for a part of the tunnel and including a chamber along each side of but isolated from said tunnel part and from each other and means in each chamber dividing the same into horizontally extending, vertically spaced ducts.

31. In a tunnel kiln construction, means providing a tunnel extending lengthwise of the kiln, means providing a cooling zone for said tunnel at one end of the kiln and including a chamber on each side of but isolated from said end of the tunnel and from each other, means in each chamber dividing the same into horizontally extending, vertically spaced ducts each opening to atmosphere at said end of the kiln and connected at their other end with a draft inducing means, and means adjacent the last mentioned end of said duct for controlling the volume of air passing through said ducts.

32. In a tunnel kiln construction, means providing a tunnel extending lengthwise of the kiln, said tunnel being formed to provide a preheating zone at one end, a cooling zone at the other end, a firing zone adjacent the preheating zone and a soaking zone between the cooling zone and the firing zone, said preheating, firing and cooling zones each including chambers disposed upon opposite sides of the tunnel but isolated therefrom.

33. A tunnel kiln construction of the kind described, embodying therein a battery of longitudinally extending kiln sections arranged side by side and each kiln section including a substantially narrow tunnel extending longitudinally thereof and means providing a firing zone for a part of each tunnel and including combustion chambers disposed upon opposite side of but isolated from the respective part of the associated tunnel.

34. A tunnel kiln construction of the kind described, embodying therein a battery of longitudinally extending kiln sections arranged side by side and each kiln section including a substantially narrow tunnel extending longitudinally thereof and means providing a firing zone for a part of each tunnel and including a plurality of separatively controllable combustion chambers arranged longitudinally along each side of said tunnel part but isolated therefrom.

35. A tunnel kiln construction of the kind described, embodying therein a battery of longitudinally extending kiln sections arranged side by side and each kiln section including a substantially narrow tunnel extending longitudinally thereof and means in each kiln section providing a preheating zone, a firing zone and a cooling zone on each side of each tunnel and spaced longitudinally of the associated tunnel but isolated therefrom.

36. A tunnel kiln construction of the kind described embodying therein a battery of longitudinally extending kiln sections arranged side by side and each kiln section including a substantially narrow tunnel extending longitudinally thereof and means in each kiln section providing a preheating zone, a firing zone and a cooling zone for each tunnel spaced longitudinally of the associated tunnel and including chambers on both sides of the associated tunnel but isolated therefrom.

37. A tunnel kiln construction of the kind described embodying therein a battery of longitudinally extending kiln sections arranged side by side and each kiln section including a substantially narrow tunnel extending longitudinally thereof and means in each kiln section providing a preheating zone at one end of the associated tunnel, a cooling zone at the other end of the associated tunnel, a firing zone adjacent the preheating zone and a soaking zone between the firing zone and cooling zone, the said zones being effective upon both sides of the associated tunnel.

38. A tunnel kiln construction of the kind described embodying therein a battery of longitudinally extending kiln sections arranged side by side and each section including a substantially narrow tunnel extending longitudinally thereof, means providing a firing zone in each kiln section for a part of the associated tunnel, each firing zone including a combustion chamber arranged on both sides of said tunnel part but isolated therefrom and each combustion chamber having regenerating chambers associated therewith.

39. A tunnel kiln construction of the kind described embodying therein a battery of longitudinally extending kiln sections arranged side by side and each section including a substantially narrow tunnel extending longitudinally thereof, means providing a firing zone in each kiln section for a part of the associated tunnel, each firing zone including a plurality of combustion chambers arranged along each side of said tunnel part but isolated therefrom and each combustion chamber having regenerating chambers operatively arranged with respect thereto.

ALBERT B. AGNEW.